United States Patent
Yasuda et al.

(10) Patent No.: US 10,020,933 B2
(45) Date of Patent: Jul. 10, 2018

(54) CRYPTOGRAPHIC PROCESSING DEVICE AND CRYPTOGRAPHIC PROCESSING METHOD

(71) Applicant: FUJITSU LIMITED, Kawasaki-shi, Kanagawa (JP)

(72) Inventors: Masaya Yasuda, Kawasaki (JP); Takeshi Shimoyama, Shinagawa (JP); Jun Kogure, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 71 days.

(21) Appl. No.: 14/934,740

(22) Filed: Nov. 6, 2015

(65) Prior Publication Data

US 2016/0173275 A1    Jun. 16, 2016

(30) Foreign Application Priority Data

Dec. 12, 2014  (JP) ................. 2014-251784

(51) Int. Cl.
  *H04L 9/00*  (2006.01)
  *H04L 29/06*  (2006.01)
  *H04L 9/14*  (2006.01)

(52) U.S. Cl.
  CPC .............. *H04L 9/008* (2013.01); *H04L 9/14* (2013.01); *H04L 63/0861* (2013.01); *H04L 2209/046* (2013.01); *H04L 2209/08* (2013.01)

(58) Field of Classification Search
  None
  See application file for complete search history.

(56) References Cited

U.S. PATENT DOCUMENTS 9,374,370 B1 *  6/2016  Bent, II ............... H04L 63/0442
9,641,489 B1 *  5/2017  Kaufman ................ H04L 9/008
(Continued)

FOREIGN PATENT DOCUMENTS

EP   2750323 A1   7/2014
JP   2011-118387   6/2011
(Continued)

OTHER PUBLICATIONS

Torres et al.; Effectiveness of Fully Homomorphic Encryption to Preserve the Privacy of Biometric Data; Dec. 6, 2014; Retrieved from the Internet <URL: http://dl.acm.org/citation.cfm?id=2684296>; pp. 1-7 as printed.*

(Continued)

*Primary Examiner* — Saleh Najjar
*Assistant Examiner* — Michael W Chao
(74) *Attorney, Agent, or Firm* — Fujitsu Patent Center (57) ABSTRACT

A memory stores therein first cryptographic information that represents an encrypted polynomial obtained by encrypting a first polynomial that corresponds to a first vector. From a terminal that receives second cryptographic information that represents an encrypted monomial obtained by encrypting a monomial generated by use of a random number, a receiver receives third cryptographic information that represents an encrypted result obtained by encrypting a result of a multiplication of a second polynomial that corresponds to a second vector by the monomial. A processor generates an encrypted polynomial that includes a result of an operation of the first vector and the second vector by use of the first cryptographic information, the third cryptographic information, and information that represents the monomial. An output interface outputs fourth cryptographic information that represents the encrypted polynomial generated by the generator.

12 Claims, 7 Drawing Sheets

(56) References Cited

U.S. PATENT DOCUMENTS

| | | | |
|---|---|---|---|
| 9,747,470 B2* | 8/2017 | Patey | G06F 21/71 |
| 9,749,128 B2* | 8/2017 | Calapodescu | H04L 9/008 |
| 9,838,388 B2* | 12/2017 | Mather | H04L 63/0861 |
| 9,942,032 B1* | 4/2018 | Kornaropoulos | H04L 9/008 |
| 2009/0282039 A1* | 11/2009 | Diamond | G06F 17/30985 |
| 2011/0026781 A1* | 2/2011 | Osadchy | G06K 9/00221 |
| | | | 382/118 |
| 2011/0176672 A1 | 7/2011 | Rane et al. | |
| 2013/0114811 A1* | 5/2013 | Boufounos | H04K 1/00 |
| | | | 380/255 |
| 2013/0339751 A1 | 12/2013 | Sun et al. | |
| 2014/0185794 A1 | 7/2014 | Yasuda et al. | |
| 2014/0281567 A1* | 9/2014 | Rane | G06F 21/32 |
| | | | 713/186 |
| 2015/0349949 A1* | 12/2015 | Boufounos | H04W 12/08 |
| | | | 380/270 |

FOREIGN PATENT DOCUMENTS

| | | |
|---|---|---|
| JP | 2014-002365 | 1/2014 |
| JP | 2014-126865 | 7/2014 |

OTHER PUBLICATIONS

Cha et al.; A Study of Secure data management system using homomorphic encryption in defense environment; Jul. 2014; Retrieved from the Internet <URL: http://www.lifesciencesite.com/lsj/life1107s/>; pp. 1-5 as printed.*

Gentry et al.; Implementing Gentry's Fully-Homomorphic Encryption Scheme; 2011; Retrieved from the Internet <URL: http://ai2-s2-pdfs.s3.amazonaws.com/8cb7/5cbb89d168152b791f960d30df5b737c0011.pdf>; pp. 1-29 as printed. (Year: 2011).*

No stated author; Wikipedia—Monomial; Retrieved from the Internet <URL: https://en.wikipedia.org/wiki/Monomial>; pp. 1-3 as printed. (Year: 2018).*

Craig Gentry; "Fully Homomorphic Encryption Using Ideal Lattices", STOC 2009, May 31-Jun. 2, 2009 pp. 169-178 (10 pages).

Kristin Lauter et al.; "Can Homomorphic Encryption be Practical?", In ACM workshop on Cloud Computing Security Workshop—CCSW 2011, Oct. 21, 2011, ACM, pp. 113-124 (12 pages).

Extended European Search dated May 11, 2016 for corresponding European Patent Application No. 151951795, 9 pages. *Please note NPL "Craig Gentry: "Fully Homomorphic Encryption Using Ideal Lattices", Proceedings of the 41st ACM Symposium on . . . " cited herewith, was previously cited in an IDS filed on Nov. 6, 2015.*

Yasuda, Masaya et al., "Secure Pattern Matching using Somewhat Homomorphic Encryption", Cloud Computin Security Workshop, ACM, Nov. 8, 2013, pp. 65-76, XP058034246.

Kipnis, Aviad et al., "Efficient Methods for Practical Fully-Homomorphic Symmetric-key Encryption, Randomization, and Verification", International Association for Cryptologic Research, vol. 20121111:161947, Nov. 8, 2012, pp. 1-20, XP061006941.

Abidin, Aysajan et al., "Security aspects of privacy-preserving biometric authentication based on ideal lattices and ring-LWE", 2014 IEEE International Workshop on Information Forensics and Security (WIFS), IEEE, Dec. 3, 2014, pp. 60-65, XP032764333.

Yasuda, Masaya et al., "Practical Packing Method in Somewhat Homomorphic Encryption", Data Privacy Management and Autonomous Spontaneous Security, Jan. 1, 2014, pp. 34-50, Berlin, Heidelberg, XP055198854, Retrieved from the Internet: URL: http://rd.springer.com/content/pdf/10.1007/978-3-642-54568-9_3.pdf.

* cited by examiner

CRYPTOGRAPHIC PROCESSING DEVICE AND CRYPTOGRAPHIC PROCESSING METHOD

CROSS-REFERENCE TO RELATED APPLICATION

This application is based upon and claims the benefit of priority of the prior Japanese Patent Application No. 2014-251784, filed on Dec. 12, 2014, the entire contents of which are incorporated herein by reference.

FIELD

The embodiments discussed herein relate to a cryptographic processing device and a cryptographic processing method.

BACKGROUND

While regulations to protect personal information and confidential information have recently been tightened, the market of the services that use on such information has been expanding. A service that uses the information on the positions of personal users that can be obtained from their smartphones is an example of such a service.

Thus, securing technologies that permit using of personal information or confidential information that remains protected have been attracting attention. Among the securing technologies, there is a method that uses a cryptographic technology or a statistical technology according to a data type or service requirements.

A homomorphic encryption technology is known as a securing technology that uses a cryptographic technology. The homomorphic encryption technology is one of the public key encryption methods in which a pair of different keys is used for encryption and decryption, and has a function that permits a data operation in a state in which the data remains encrypted. For example, an encryption function E of a homomorphic encryption with respect to addition and multiplication has the characteristics as described in the following formulas for a plain text m1 and a plain text m2:

$$E(m1)+E(m2)=E(m1+m2) \quad (1)$$

$$E(m1)*E(m2)=E(m1*m2) \quad (2)$$

Formula (1) indicates that it is homomorphic for addition, and Formula (2) indicates that it is homomorphic for multiplication. As described above, according to the homomorphic encryption technology, when performing, on two or more encrypted texts, an operation that corresponds to an addition or multiplication, an encrypted text that is a result of an operation of adding or multiplying the original plain texts can be obtained without decrypting the encrypted texts.

Such characteristics of a homomorphic encryption have been expected to be used in the field of e-voting or e-money, or in the field of cloud computing, in recent years. As a homomorphic encryption with respect to addition or multiplication, the Rivest Shamir Adleman (RSA) encryption that only permits multiplication to be performed and the Additive ElGamal encryption that only permits addition to be performed are known.

Further, a homomorphic encryption that satisfies Formulas (1) and (2) was proposed in 2009 that permits both addition and multiplication to be performed (see, for example, Non Patent Document 1). Non Patent Document 1 only discloses a theoretical method for realizing a homomorphic encryption, and does not disclose a practical constructing method. However, in recent years, a practical constructing method of a somewhat homomorphic encryption has been proposed that permits both addition and multiplication to be performed (see, for example, Non Patent Document 2).

For a secured distance calculation using a homomorphic encryption, a cryptographic processing device that permits a reduction in both a size of encrypted vector data and a time for the secured distance calculation is also known (see, for example, Patent Document 1). This cryptographic processing device obtains a first polynomial from a first vector by use of a first transform polynomial and a second polynomial from a second vector by use of a second transform polynomial. Then, the cryptographic processing device obtains a first weight that relates to a secured distance of the first vector and a second weight that relates to a secured distance of the second vector.

Next, the cryptographic processing device encrypts each of the first polynomial, the second polynomial, the first weight, and the second weight using a homomorphic encryption, so as to obtain a first encrypted polynomial, a second encrypted polynomial, a first encrypted weight, and a second encrypted weight. Then, the cryptographic processing device obtains an encrypted secured distance that corresponds to an encryption of a secured distance between the first vector and the second vector from the first encrypted polynomial, the second encrypted polynomial, the first encrypted weight, and the second encrypted weight.

Patent Document 1: Japanese Laid-open Patent Publication No. 2014-126865

Non Patent Document 1: C. Gentry, "Fully Homomorphic Encryption Using Ideal Lattices", STOC 2009, pp. 169-178, 2009.

Non Patent Document 2: K. Lauter, M. Naehrig and V. Vaikuntanathan, "Can Homomorphic Encryption be Practical?", In ACM workshop on Cloud Computing Security Workshop-CCSW 2011, ACM, pp. 113-124, 2011.

SUMMARY

According to an aspect of the embodiments, a cryptographic processing device includes a memory, a receiver, a processor, and an output interface.

The memory stores therein first cryptographic information that represents an encrypted polynomial obtained by encrypting a first polynomial that corresponds to a first vector. From a terminal that receives second cryptographic information that represents an encrypted monomial obtained by encrypting a monomial generated by use of a random number, the receiver receives third cryptographic information that represents an encrypted result obtained by encrypting a result of a multiplication of a second polynomial that corresponds to a second vector by the monomial.

The processor generates an encrypted polynomial that includes a result of an operation of the first vector and the second vector by use of the first cryptographic information, the third cryptographic information, and information that represents the monomial. The output interface outputs fourth cryptographic information that represents the encrypted polynomial generated by the generator.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of the present invention will now be described in detail with reference to the drawings.

Section 3.2 of Non Patent Document 2 discloses a practical constructing method of a homomorphic encryption. According to this method, three key-generating parameters (n, q, t) are mainly used to generate an encryption key. n is an integer that is a power of two, and is referred to as a lattice dimension. q is a prime, and t is an integer that is less than the prime q.

In the process of the encryption key generation, first, a polynomial sk of degree n−1 in which each coefficient is very small is generated as a secret key at random. The value of each coefficient is restricted by a certain parameter σ. Next, a polynomial a1 of degree n−1 in which each coefficient is less than q and a polynomial e of degree n−1 in which each coefficient is very small are generated at random. Then, the following formula for a polynomial a0 is calculated, and a pair of polynomials (a0,a1) is defined as a public key pk.

$$a0 = -(a1*sk + t*e) \quad (11)$$

However, in a calculation of the polynomial a0, a polynomial whose degree is lower than n is always calculated by using "$x^n = -1$, $x^{n+1} = -x$, ..." with respect to a polynomial whose degree is higher than or equal to n. Further, as a coefficient in each term included in a polynomial, a remainder obtained by dividing the coefficient by a prime q is used. A space in which such a polynomial operation is performed is often technically represented as $R_q := F_q[x]/(x^n+1)$.

Next, for plaintext data m that is represented by a polynomial of degree n−1 in which each coefficient is less than t and a public key pk, three polynomials u, f, and g of degree n−1 in which each coefficient is very small are generated at random, and cryptographic data Enc(m,pk) of the plaintext data m is defined by the following formulas:

$$Enc(m,pk) = (c0, c1) \quad (12)$$

$$c0 = a0*u + t*g + m \quad (13)$$

$$c1 = a1*u + t*f \quad (14)$$

The polynomial operation in the space $R_q$ is also used for a calculation of the polynomial c0 and the polynomial c1. In this case, a cryptographic addition for cryptographic data Enc(m1,pk)=(c0,c1) and cryptographic data Enc(m2,pk)=(d0,d1) is performed by the following formula:

$$Enc(m1,pk) + Enc(m2,pk) = (c0+d0, c1+d1) \quad (15)$$

Further, a cryptographic multiplication for the cryptographic data Enc(m1,pk) and the cryptographic data Enc(m2,pk) is performed by the following formula:

$$Enc(m1,pk)*Enc(m2,pk) = (c0*d0, c0*d1+c1*d0, c1*d1) \quad (16)$$

When performing the cryptographic multiplication by Formula (16), the cryptographic data changes from that of a two-dimensional vector to that of three-dimensional vector. If the cryptographic multiplication is repeated several times, there is a further increase in the elements of the cryptographic data that is a multiplication result.

Next, decryption processing is described. The cryptographic data c=(c0, c1, c2, ... ) in which the elements have increased as a result of an operation such as a several-times cryptographic multiplication is decrypted by calculating the following formula for a decryption result Dec(c,sk) by use of a secret key sk.

$$Dec(c,sk) = [c0 + c1*sk + c2*sk^2 + \ldots ]_q \bmod t \quad (17)$$

In Formula (17), $[f(x)]_q \bmod t$ represents a polynomial in which each coefficient $z_i$ in a polynomial f(x) is replaced with $[z_i]_q \bmod t$. A value of $[z]_q$ for an integer z is defined by the following formula by use of a remainder w obtained by dividing z by q:

$$[z]_q = w \text{ (in case of } w < q/2) \quad (18)$$

$$[z]_q = w - q \text{ (in case of } w \geq q/2) \quad (19)$$

Thus, the range of values of $[z]_q$ is $[-q/2, q/2)$. Further, a mod t represents a remainder obtained by dividing an integer a by t.

Taking (n, q, t)=(4, 1033, 20) for example, the following polynomial is a simple example of a secret key sk, a public key pk, and cryptographic data Enc(m,pk):

$$sk = Mod(Mod(4, 10033)*x^3 + Mod(4, 1033)*x^2 + Mod(1, 1033)*x, x^4+1) \quad (20)$$

$$pk = (a0, a1) \quad (21)$$

$$a0 = Mod(Mod(885, 1033)*x^3 + Mod(519, 1033)*x^2 + Mod(621, 1033)*x + Mod(327, 1033), x^4+1) \quad (22)$$

$$a1 = Mod(Mod(661, 1033)*x^3 + Mod(625, 1033)*x^2 + Mod(861, 1033)*x + Mod(311, 1033), x^4+1) \quad (23)$$

$$Enc(m, pk) = (c0, c1) \quad (24)$$

$$m = 3 + 2x + 2x^2 + 2x^3 \quad (25)$$

$$c0 = Mod(Mod(822, 1033)*x^3 + Mod(1016, 1033)*x^2 + Mod(292, 1033)*x + Mod(243, 1033), x^4+1) \quad (26)$$

$$c1 = Mod(Mod(840, 1033)*x^3 + Mod(275, 1033)*x^2 + Mod(628, 1033)*x + Mod(911, 1033), x^4+1) \quad (27)$$

In Formulas (20) to (27), Mod(a,q) represents a remainder obtained by dividing an integer a by a prime q, and Mod(f(x), $x^4+1$) represents a remainder (polynomial) obtained by dividing a polynomial f(x) by a polynomial $x^4+1$. For example, Mod(f(x), $x^4+1$) for f(x)=$x^4$ is equal to Mod(f(x), $x^4+1$) for f(x)=−1, and Mod(f(x), $x^4+1$) for f(x)=$x^5$ is equal to Mod(f(x), $x^4+1$) for f(x)=−x.

The two pieces of cryptographic data, Enc(f(x),pk) and Enc(g(x),pk), for the two polynomials of a degree not higher than n−1, f(x) and g(x), have characteristics with respect to addition and multiplication as described in the following formulas:

$$Enc(f(x),pk)+Enc(g(x),pk)=Enc(f(x)+g(x),pk) \quad (31)$$

$$Enc(f(x),pk)*Enc(g(x),pk)=Enc(f(x)*g(x),pk) \quad (32)$$

Further, a cryptographic processing device of Patent Document 1 permits a great improvement in processing time and a size of cryptographic data by performing a polynomial transformation to represent the vector data as one polynomial and encrypting the polynomial by a homomorphic encryption.

In this cryptographic processing device, for example, the following two d-dimensional vectors are used as input data:

$$A=(a_0,a_2,\ldots,a_{n-1}) \quad (41)$$

$$B=(b_0,b_2,\ldots,b_{n-1}) \quad (42)$$

The following two types of polynomial transformation, for example, an ascending-order transformation and a descending-order transformation, are used to calculate an inner product or a distance of two vectors at a high speed in a state in which those two vectors remain encrypted.

[Ascending-Order Transformation]

$$A=(a_0,a_1,a_2,\ldots,a_{n-1}) \Rightarrow pm1(A)=\Sigma_{i=0}^{n-1} a_i x^i \quad (43)$$

[Descending-Order Transformation]

$$B=(b_0,b_1,b_2,\ldots,b_{n-1}) \Rightarrow pm2(B)=-\Sigma_{i=0}^{n-1} b_i x^{n-i} \quad (44)$$

When encrypting the polynomial pm1(A) and the polynomial pm2(B) by a homomorphic encryption, an encrypted polynomial E (pm1(A)) and an encrypted polynomial E (pm2(B)) are generated.

$$E(pm1(A))=Enc(pm1(A),pk) \quad (45)$$

$$E(pm2(B))=Enc(pm2(B),pk) \quad (46)$$

When multiplying the encrypted polynomial E(pm1(A)) by the encrypted polynomial E(pm2(B)), a multiplication pm1(A)*pm2(B) is performed in a state in which the polynomials remain encrypted. Then, when decrypting a multiplication result E(pm1(A))*E(pm2(B)), a constant term included in a polynomial that is a decryption result is a value such as the following formula:

$$\sum_{i=0}^{n-1} a_i b_i = a_0 b_0 + a_1 b_1 + \ldots + a_{n-1} b_{n-1} \quad (47)$$

Formula (47) represents an inner product of a vector A and a vector B. According to this method, it is possible to calculate the inner product more efficiently than by using the method for encrypting respective elements of the vector A and the vector B and multiplying them. Further, it is also possible to calculate, for example, a Hamming distance or an L2 norm at a high speed in a state in which they remain encrypted, using this inner calculation.

Figure 1:
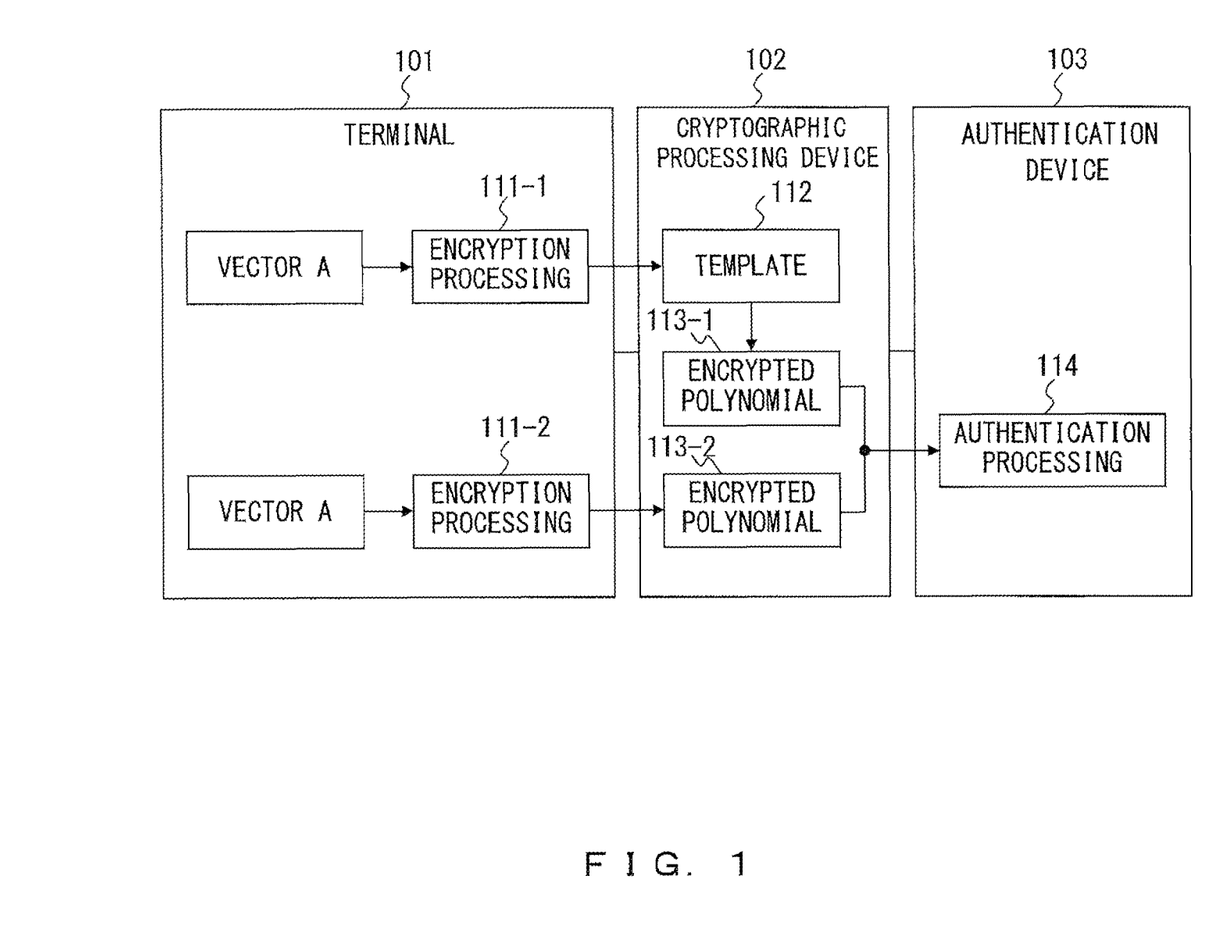
FIG. 1 is a block diagram of a biometric system using encrypted polynomials.

FIG. 1 is a block diagram of an example of a biometric system for which the cryptographic processing device disclosed in Patent Document 1 is used. The biometric system in FIG. 1 is a personal authentication system that uses biometric information, and includes a terminal 101, a cryptographic processing device 102, and an authentication device 103. The cryptographic processing device 102 is connected to the terminal 101 and the authentication device 103 via a communication network. The terminal 101 is, for example, a device of a user such as a client terminal, and the cryptographic processing device 102 and the authentication device 103 are, for example, a server. The terminal 101 has a public key of a homomorphic encryption and the authentication device 103 has a secret key of a homomorphic encryption.

While the biometric system is a personal authentication system that can easily be used because a user does not have to remember complicated information such as a password, it is desirable to provide strong protections against, for example, leaks of biometric information because the biometric information is permanent confidential information for the user. Thus, in the biometric system in FIG. 1, biometric information of a user is protected using a homomorphic encryption.

When registering biometric information, the terminal 101 obtains biometric information on a user who is a registrant using a sensor, transforms the feature information extracted from the biometric information into a vector A as described in Formula (41), and performs encryption processing 111-1. As biometric information obtained by a sensor, image information such as a fingerprint, a face, a vein, and an iris, or phonetic information such as a voice can be used.

In the encryption processing 111-1, the terminal 101 transforms the vector A into a polynomial pm1(A) as described in Formula (43), and encrypts the polynomial pm1(A) using a homomorphic encryption so as to generate an encrypted polynomial E(pm1(A)). Then, the terminal 101 transmits cryptographic information that represents the encrypted polynomial E(pm1(A)) to the cryptographic processing device 102. The cryptographic processing device 102 registers the cryptographic information received from the terminal 101 in a database as a template 112 that represents registered biometric information.

When authenticating biometric information, the terminal 101 obtains biometric information on a user who is a target to be authenticated, transforms feature information extracted from the biometric information into a vector B as described in Formula (42), and performs encryption processing 111-2.

In the encryption processing 111-2, the terminal 101 transforms the vector B into a polynomial pm2(B) as described in Formula (44), and encrypts the polynomial pm2(B) using a homomorphic encryption so as to generate an encrypted polynomial E(pm2(B)). Then, the terminal 101 transmits cryptographic information that represents the encrypted polynomial E(pm2(B)) to the cryptographic processing device 102.

The cryptographic processing device 102 performs a cryptographic operation by use of the encrypted polynomial E(pm1(A)) represented by the template 112 and the encrypted polynomial E(pm2(B)) represented by the cryptographic information received from the terminal 101, and transmits cryptographic information that represents a result of the cryptographic operation to the authentication device 103.

The authentication device 103 performs authentication processing 114 on the basis of the cryptographic information received from the cryptographic processing device 101. In the authentication processing 114, the authentication device 103 generates a result of an operation of the vector A and the vector B by decrypting the received cryptographic information, and performs authentication on the basis of the generated result of the operation.

For example, a distance between the vector A and the vector B (such as a Hamming distance) is used as the result of the operation of the vector A and the vector B. In this case, the cryptographic processing device 102 can calculate the distance between the vector A and the vector B in a state in which the two vectors remain encrypted, and the authentication device 103 can determine whether authentication has been successful by comparing the distance to a threshold. It is determined that the authentication of the target to be authenticated has been successful when the distance is less than the threshold, and it is determined that the authentication has been unsuccessful when the distance is not less than the threshold.

According to such a biometric system, the terminal 101 only transmits encrypted information to the cryptographic processing device 102, and the cryptographic processing device 102 does not have a secret key, so the cryptographic processing device 102 never knows the vectors that represent biometric information of a user. Further, the cryptographic processing device 102 only transmits a result of a cryptographic operation to the authentication device 103, and the authentication device 103 only generates a result of an operation of a vector A and a vector B by description, so the authentication device 103, too, never knows the vectors that represent the biometric information of the user.

Thus, unless the cryptographic processing device 102 and the authentication device 103 collude with each other, neither the vector A nor the vector B is generated, and a personal authentication service is provided in a state in which the biometric information of the user remains protected.

However, in the biometric system in FIG. 1, it is possible for a malicious user to spoof a normal user by performing a replay attack. The replay attack is one of the typical spoofing attacks in an authentication system; in concrete terms, an attacker illegally obtains cryptographic information on an encrypted polynomial that is to be transmitted by a normal user by eavesdropping on the communication path between the terminal 101 and the cryptographic processing device 102. The attacker retransmits the obtained cryptographic information to the cryptographic processing device 102 spoofing the normal user, which permits a successful authentication to be performed by the authentication device 103.

The above-mentioned problem may occur not only in a personal authentication system based on an encrypted secured distance but also in the other authentication systems based on a cryptographic operation by use of encrypted polynomials.

The challenge-response authentication scheme is effective against such a replay attack. In this authentication scheme, a device which performs authentication generates a random number that is called a "challenge", and transmits it to a terminal. The terminal generates data that is called a "response" on the basis of the received challenge and information to be authenticated, and replies to the device which performs authentication. Then, the device which performs authentication performs authentication processing by use of the challenge and the received response. According to the challenge-response authentication scheme, authentication will not be successfully performed even if a response is obtained by eavesdropping and is retransmitted because the response changes every time the challenge is generated.

Thus, an introduction of a mechanism that uses a challenge-response authentication is considered as protection against replay attacks in the biometric system in FIG. 1.

Figure 2:
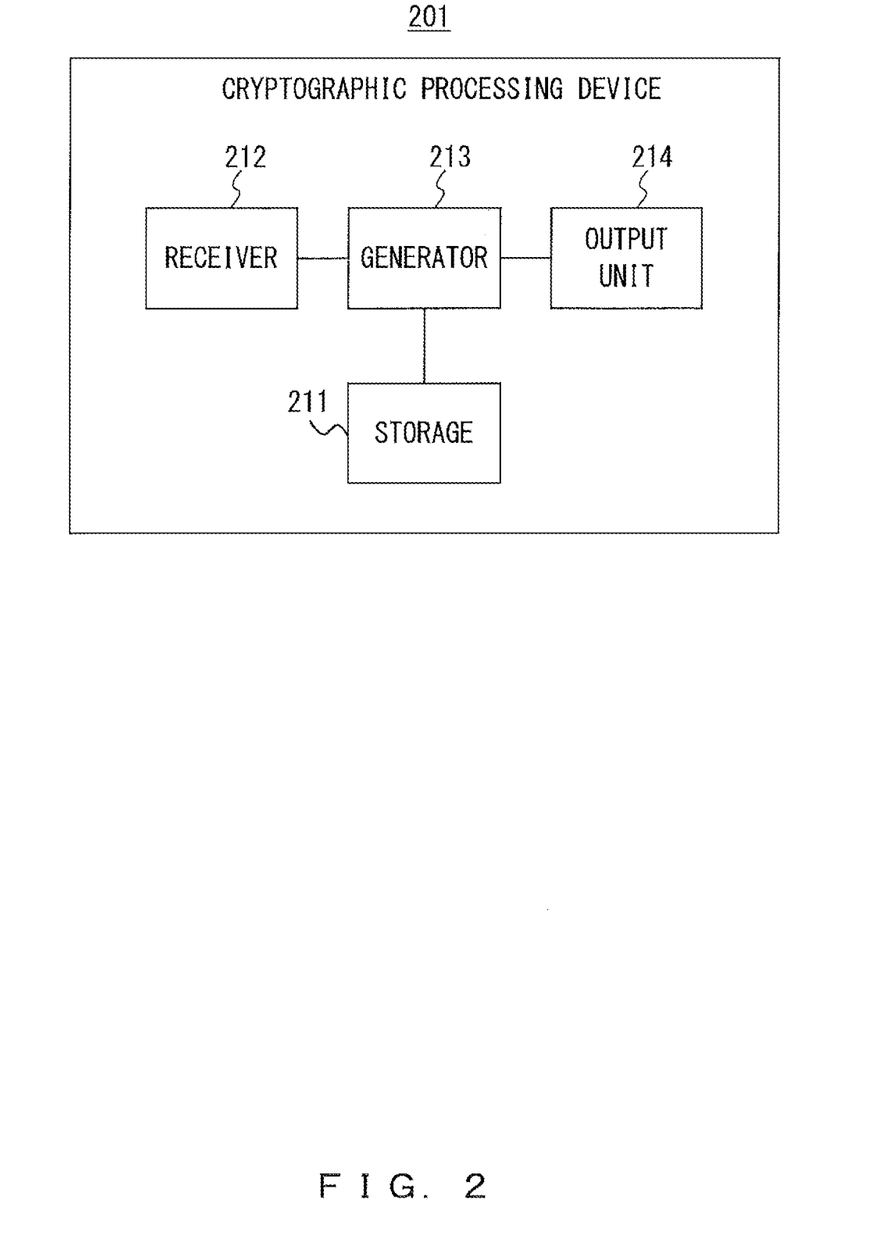
FIG. 2 is a functional block diagram of a cryptographic processing device.

FIG. 2 is a functional block diagram of an example of a cryptographic processing device according to embodiments. The cryptographic processing device 201 in FIG. 2 includes a storage 211, a receiver 212, a generator 213, and an output unit 214. The storage 211 stores therein first cryptographic information that represents a first encrypted polynomial obtained by encrypting a first polynomial that corresponds to a first vector. The receiver 212 receives third cryptographic information from a terminal that receives second cryptographic information that represents an encrypted monomial obtained by encrypting a monomial generated by use of a random number. The generator 213 performs a cryptographic process by use of the first cryptographic information and the third cryptographic information, and the output unit 214 is an output interface and outputs a result of the cryptographic process.

Figure 3:
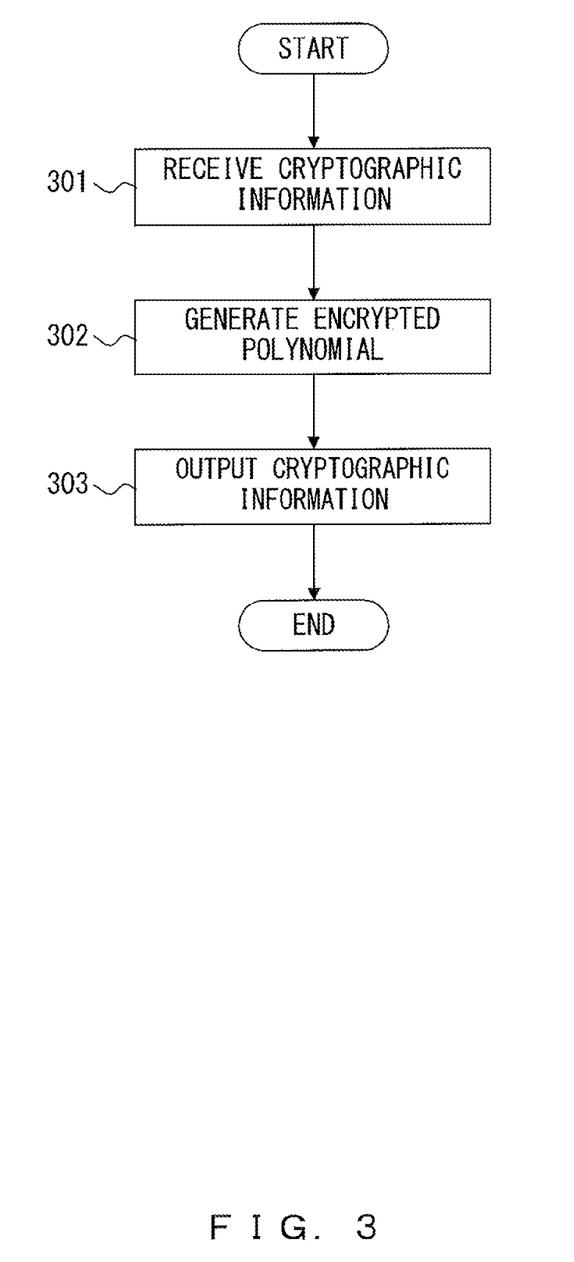
FIG. 3 is a flowchart of a cryptographic process.

FIG. 3 is a flowchart of an example of the cryptographic process performed by the cryptographic processing device 201 in FIG. 2. First, the receiver 212 receives, from the terminal, the third cryptographic information that represents an encrypted result obtained by encrypting a result of a multiplication of a second polynomial that corresponds to a second vector by the monomial (Step 301).

Next, the generator generates an encrypted polynomial that includes a result of an operation of the first vector and the second vector by use of the first cryptographic information, the third cryptographic information, and information that represents the monomial (Step 302). Then, the output unit 214 outputs fourth cryptographic information that represents the encrypted polynomial generated by the generator 213 (Step 303).

Such a cryptographic processing device 201 permits improving of resistance to eavesdropping on cryptographic information in a cryptographic operation by use of encrypted polynomials.

As described in Formulas (31) and (32), in a cryptographic operation using a homomorphic encryption, addition and multiplication for two polynomials f(x) and g(x) have the characteristics described in the following formulas:

$$E(f(x))+E(g(x))=E(f(x)+g(x)) \tag{51}$$

$$E(f(x))*E(g(x))=E(f(x)*g(x)) \tag{52}$$

Further, when using the practical constructing method disclosed in Non Patent Document 2, the characteristics of these addition and multiplication can be rewritten into the following formulas:

$$f(x)+E(g(x))=E(f(x)+g(x)) \tag{53}$$

$$f(x)*E(g(x))=E(f(x)*g(x)) \tag{54}$$

Formula (53) or Formula (54) indicate that even if an f(x) that has not been encrypted is added to or multiplied by E(g(x)), it is possible to obtain a decryption result that is identical with E(f(x)+g(x)) or E(f(x)*g(x)) when decrypting an operation result obtained by the addition or the multiplication. Such a cryptographic operation makes processing more efficient because the processing of encrypting f(x) can be omitted. Therefore, the characteristics of Formula (53) and Formula (54) may be used in the following cryptographic operation.

Figure 4:
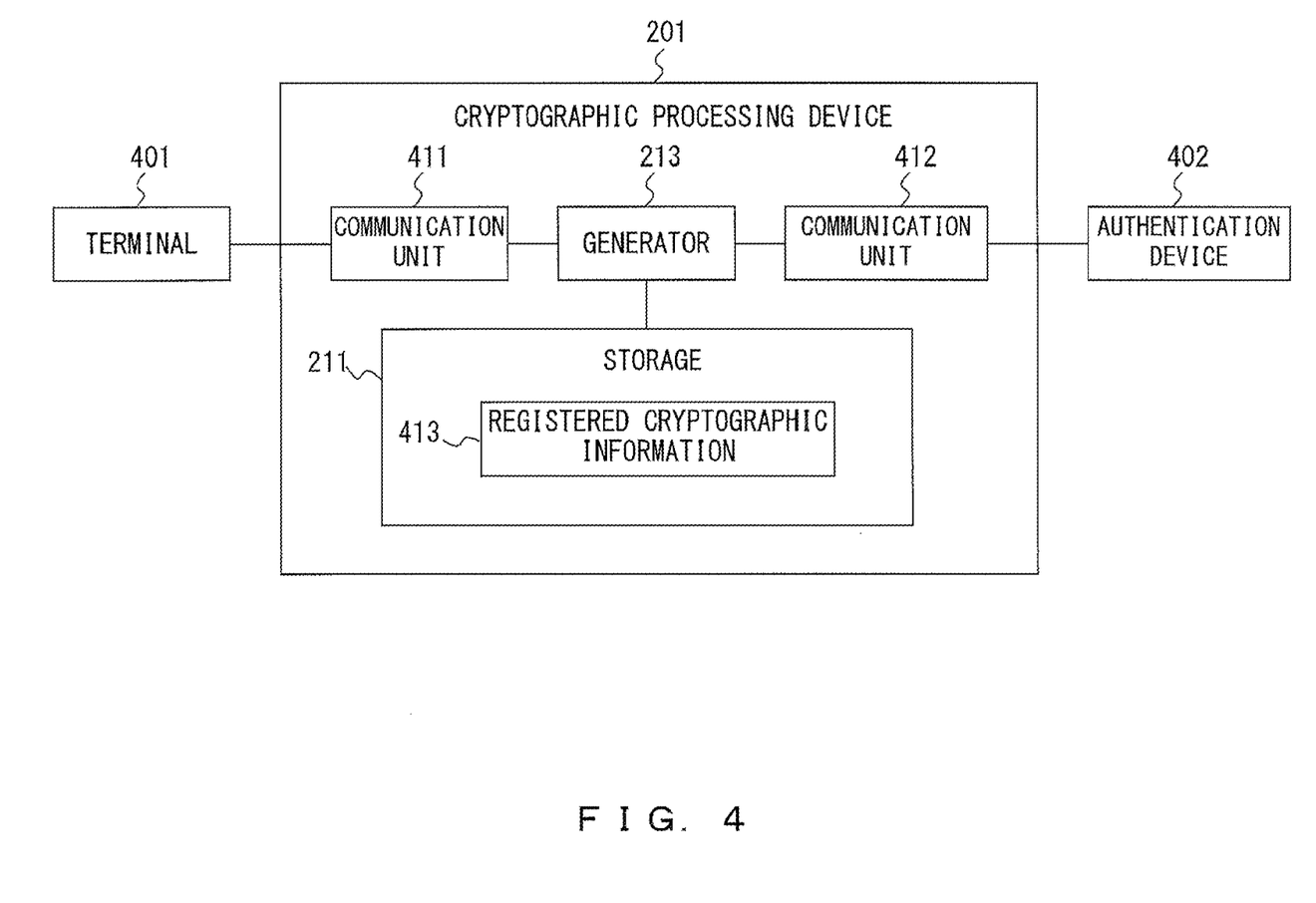
FIG. 4 is a block diagram of a biometric system that includes the cryptographic processing device.

FIG. 4 is a block diagram of an example of a biometric system that includes the cryptographic processing device 201 in FIG. 2. The biometric system in FIG. 4 includes the cryptographic processing device 201, a terminal 401, and an authentication device 402. The cryptographic processing device 201 includes the storage 211, the generator 213, a communication unit 411, and a communication unit 412. The communication unit 411 and the communication unit 412 correspond to the receiver 212 and the output unit 214 in FIG. 2, respectively.

The cryptographic processing device 201 is connected to the terminal 401 and the authentication device 402 through a communication network, the communication unit 411 communicates with the terminal 401, and the communication unit 412 communicates with the authentication device 402.

When registering biometric information, the terminal 401 obtains biometric information on a registrant using a sensor, and transforms the feature information extracted from the biometric information into a vector A as described in Formula (41). Next, the terminal 401 transforms the vector A into a polynomial pm1(A) as described in Formula (43), and encrypts the polynomial pm1(A) using a homomorphic encryption so as to generate an encrypted polynomial E(pm1(A)). Then, the terminal 401 transmits cryptographic information that represents the encrypted polynomial E(pm1(A)) to the cryptographic processing device 201.

The cryptographic processing device 201 stores the cryptographic information received from the terminal 401 in the storage 211 as registered cryptographic information 413. As cryptographic information that represents an encrypted polynomial, for example, a coefficient included in each term of the encrypted polynomial can be used.

Figure 5:
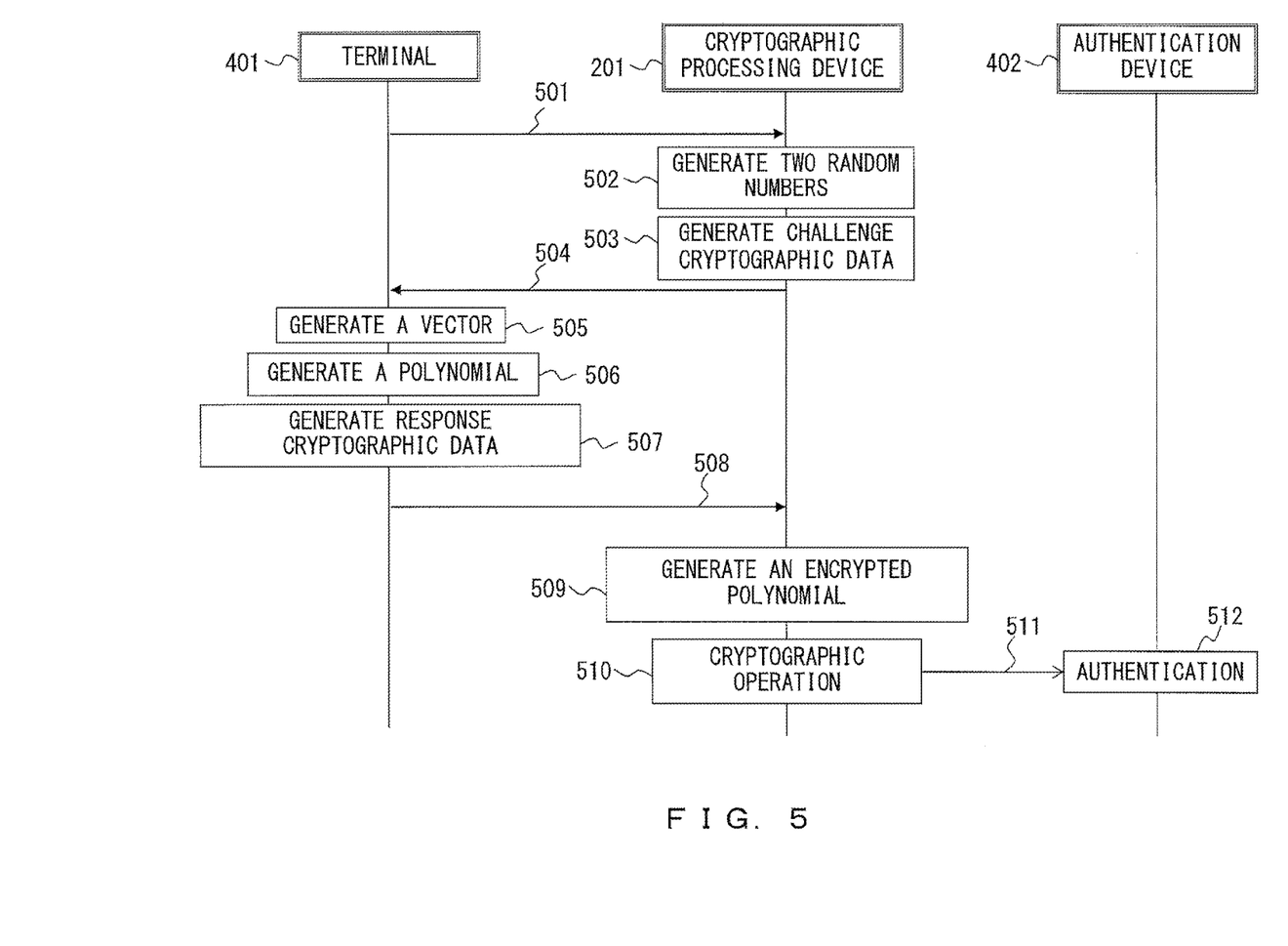
FIG. 5 is a flowchart of a first specific example of the cryptographic process.

FIG. 5 is a flowchart of a first specific example of the cryptographic process performed by the biometric system in FIG. 4 when authenticating biometric information. First, the terminal 401 transmits an authentication request to the cryptographic processing device 201 (Step 501).

Next, in response to the authentication request received from the terminal 401, the generator 213 in the cryptographic processing device 201 generates two random numbers r and k, and generates a monomial $rx^k$ by use of r and k (Step 502). The random number r is an integer not less than zero, and is less than the key-generating parameter t. The random number k is not less than zero, and is less than the lattice dimension n.

The generator 213 generates challenge cryptographic data ch1=E($rx^k$) by encrypting the monomial $rx^k$ using a homomorphic encryption (Step 503), and the communication unit 411 transmits cryptographic information that represents the challenge cryptographic data ch1 to the terminal 401 (Step 504). The challenge cryptographic data ch1 corresponds to the encrypted monomial.

Next, the terminal 401 obtains biometric information on a target to be authenticated by a sensor, transforms the feature information extracted from the biometric information into a vector B as described in Formula (42) (Step 505), and transforms the vector B into a polynomial pm2(B) as described in Formula (44) (Step 506).

Next, the terminal 401 multiplies the polynomial pm2(B) by the challenge cryptographic data ch1 received from the cryptographic processing device 201, so as to obtain pm2(B)*ch1 (Step 507). Then, the terminal 401 adds pm2(B)*ch1 to cryptographic data E(0) of zero, so as to generate response cryptographic data res.

$$res = pm2(B)^*ch1 + E(0) \quad (61)$$
$$= E(pm2(B)^*rx^{\wedge}k)$$

Next, the terminal 401 transmits cryptographic information that represents the response cryptographic data res to the cryptographic processing device 201 (Step 508). This response cryptographic data res indicates an encrypted result obtained by encrypting a result of a multiplication of the polynomial pm2(B) by the monomial $rx^k$ using a homomorphic encryption. Even when an attacker eavesdrops on challenge cryptographic data ch1 and response cryptographic data res, it is possible to prevent a vector B from being decrypted from these pieces of information by adding E(0) to pm2(B)*ch1.

Next, the generator 213 in the cryptographic processing device 201 generates an inverse $r^{\wedge}(-1)x^{\wedge}(-k)$ of the monomial $rx^k$ by use of the random numbers r and k generated when generating the challenge cryptographic data ch1 (Step 509). Then, the generator 213 multiplies the response cryptographic data res received from the terminal 401 by $r^{\wedge}(-1)x^{\wedge}(-k)$, so as to obtain an encrypted polynomial E(pm2(B)).

$$r^{\wedge}(-1)x^{\wedge}(-k)^*res = r^{\wedge}(-1)x^{\wedge}(-k)^*E(pm2(B)^*rx^{\wedge}k) \quad (62)$$
$$= E(pm2(B))$$

Next, the generator 213 performs a cryptographic operation by use of the encrypted polynomial E (pm1(A)) and the encrypted polynomial E (pm2(B)) that are stored in the storage 211, so as to generate a result of the cryptographic operation (Step 510). Then, the communication unit 412 transmits cryptographic information that represents a result of the cryptographic operation to the authentication device 402 (Step 511).

The authentication device 402 decrypts the cryptographic information received from the cryptographic processing device 201, so as to generate a result of an operation of the vector A and the vector B (Step 512). Then, the authentication device 402 authenticates the target to be authenticated on the basis of the generated result of the operation, and outputs an authentication result.

The result of the operation of the vector A and the vector B may be an inner product of the vector A and the vector B, or may be a similarity based on the inner product (such as cosine similarity), or may be a dissimilarity based on the inner product (such as a Hamming distance and a Euclidean distance).

For example, when the result of the operation is a similarity based on the inner product of the vector A and the vector B, the authentication device 402 can determine whether authentication has been successful by comparing the similarity to a threshold. In this case, it is determined that the authentication of the target to be authenticated has been successful when the similarity is greater than the threshold, and it is determined that the authentication has been unsuccessful when the similarity is not greater than the threshold.

When the result of the operation is a dissimilarity based on the inner product of the vector A and the vector B, the authentication device 402 can determine whether authentication has been successful by comparing the dissimilarity to the threshold. In this case, it is determined that the authentication of the target to be authenticated has been successful when the dissimilarity is less than the threshold, and it is determined that the authentication has been unsuccessful when the dissimilarity is not less than the threshold.

For example, when the vector A and the vector B are binary vectors, all the elements $a_0$ to $a_{n-1}$ of the vector A are 0 or 1, and all the elements $b_0$ to $b_{n-1}$ of the vector B are 0 or 1. In this case, as a result of the cryptographic operation of E(pm1(A)) and E(pm2(B)), the generator 213 can calculate an encrypted Hamming distance $E(D_H)$ between the vector A and the vector B by the following formula:

$$E(D_H)=E(pm1(A))*C1+E(pm2(B))*C2-2*E(pm1(A))\\*E(pm2(B)) \quad (63)$$

In this case, a polynomial C1 and a polynomial C2 are obtained using the following formulas:

$$C1 = 2 - C2 \quad (64)$$

$$C2 = \sum_{i=0}^{n-1} x^i \quad (65)$$

The communication unit 412 transmits cryptographic information that represents the encrypted Hamming distance $E(D_H)$ to the authentication device 402, and the authentication device 402 decrypts the encrypted Hamming distance $E(D_H)$ represented by the received cryptographic information, so as to generate a polynomial $D_H$ that is a decryption result. This polynomial $D_H$ is equivalent to a polynomial obtained by calculating the following formula:

$$pm1(A)*C1+pm2(B)*C2-2*pm1(A)*pm2(B) \quad (66)$$

Thus, a Hamming distance HD between the vector A and the vector B is obtained from a constant term included in the polynomial $D_H$.

$$HD=a_0+a_1+\ldots+a_{n-1}+b+b_1+\ldots+b_{n-1}-2(a_0b_0+\\a_1b_1+\ldots+a_{n-1}b_{n-1}) \quad (67)$$

According to the cryptographic process in FIG. 5, authentication will not be successfully performed even if an attacker eavesdrops on response cryptographic data and retransmits it because the response cryptographic data changes every time the cryptographic processing device 201 generates challenge cryptographic data. As a result, it is possible to prevent spoofing by a replay attack.

Figure 6:
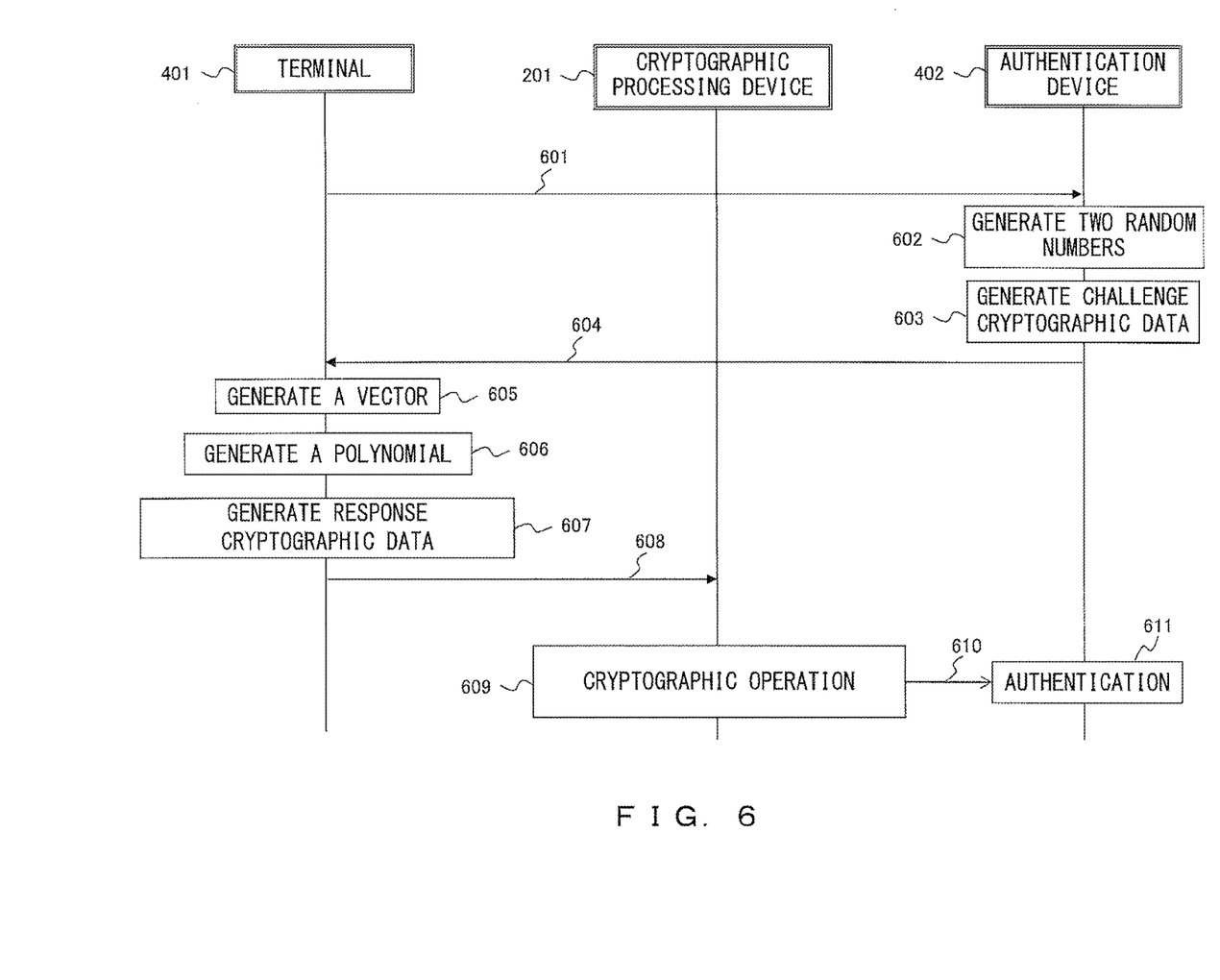
FIG. 6 is a flowchart of a second specific example of the cryptographic process.

FIG. 6 is a flowchart of a second specific example of the cryptographic process performed by the biometric system in FIG. 4 when authenticating biometric information. In the cryptographic process in FIG. 6, instead of the cryptographic processing device 201, the authentication device 402 generates challenge cryptographic data. First, the terminal 401 transmits an authentication request to the authentication device 402 (Step 601).

Next, in response to the authentication request received from the terminal 401, the authentication device 402 generates two random numbers r and k, and generates a monomial rx^k (Step 602). Then, the authentication device 402 generates challenge cryptographic data ch1=E(rx^k) by encrypting the monomial rx^k using a homomorphic encryption (Step 603), and transmits cryptographic information that represents the challenge cryptographic data ch1 to the terminal 401 (Step 604).

Next, the terminal 401 obtains biometric information on a target to be authenticated by a sensor, transforms the feature information extracted from the biometric information into a vector B as described in Formula (42) (Step 605), and transforms the vector B into a polynomial pm2(B) as described in Formula (44) (Step 606).

Next, the terminal 401 generates response cryptographic data res by use of the polynomial pm2(B) and the challenge cryptographic data ch1 received from the authentication device 402 (Step 607). Then, the terminal 401 transmits cryptographic information that represents the challenge cryptographic data ch1 and cryptographic information that represents the response cryptographic data res to the cryptographic processing device 201 (Step 608).

Next, the generator 213 in the cryptographic processing device 201 performs a cryptographic operation such as the following formula, by use of the encrypted polynomial E(pm1(A)), the challenge cryptographic data ch1, and the response cryptographic data res that are stored in the storage 211 (Step 609):

$$E(D_x)=E(pm1(A))*C1*ch1+res*C2-2E(pm1(A))*res \quad (71)$$

Then, the communication unit 412 transmits cryptographic information that represents a result of the cryptographic operation $E(D_X)$ in Formula (71) to the authentication device 402 (Step 610).

The authentication device 402 decrypts the result of the cryptographic operation $E(D_X)$ that is represented by the cryptographic information received from the cryptographic processing device 201, so as to generate a decryption result $D_X$ (Step 611). This decryption result $D_X$ is equivalent to a polynomial obtained by calculating the following formula:

$$pm1(A)*C1*rx^k+pm2(B)*rx^k*C2-2*pm1(A)*pm2\\(B)*rx^k=rx^k*(pm1(A)*C1+pm2(B)*C2-2*pm1\\(A)*pm2(B)) \quad (72)$$

pm1(A)*C1+pm2(B)*C2-2*pm1(A)*pm2(B) on the right side of Formula (72) is identical with the polynomial in Formula (66). In other words, the result of the cryptographic operation $E(D_X)$ in Formula (71) represents a result obtained by calculating rx^k*$D_H$ in a state in which it remains encrypted, and the authentication device 402 can obtain $D_x$=rx^k*$D_H$ by decrypting the result of the cryptographic operation $E(D_X)$.

Next, the authentication device 402 generates an inverse r^(-1)x^(-k) of the monomial rx^k by use of the random numbers r and k generated when generating the challenge cryptographic data ch1. Then, the authentication device 402 obtains a polynomial $D_H$ by multiplying the decryption result $D_X$ by r^(-1)x^(-k), and obtains a Hamming distance HD between the vector A and the vector B from a constant term included in the polynomial $D_H$.

Then, the authentication device 402 authenticates the target to be authenticated by comparing the Hamming distance HD to a threshold, and outputs an authentication result. In this case, it is determined that the authentication of the target to be authenticated has been successful when the Hamming distance HD is less than the threshold, and it is determined that the authentication has been unsuccessful when the Hamming distance HD is not less than the threshold.

According to the cryptographic process in FIG. 6, authentication will not be successfully performed even if an attacker eavesdrops on response cryptographic data and retransmits it because the response cryptographic data changes every time the authentication device 402 generates challenge cryptographic data. As a result, it is possible to prevent spoofing by a replay attack.

The configurations of the cryptographic processing device 201 in FIG. 2 and the biometric system in FIG. 4 are merely examples and some of the components may be omitted or changed according to the applications or the requirements of the cryptographic processing device 201. For example, in the biometric system in FIG. 4, a target to be authenticated may perform processing for authenticating biometric information using a different terminal than the terminal 401. A plurality of users may perform processing for registering and authenticating biometric information, and a plurality of terminals 401 may be provided for the plurality of users.

Further, the cryptographic processing device 201 in FIG. 2 is also applicable to an authentication system other than a biometric system that uses a result of an operation of a vector A and a vector B. For example, it is possible to perform a personal authentication by transforming information other than biometric information, such as image information and phonetic information, into vectors.

The flowcharts illustrated in FIGS. 3, 5, and 6 are merely examples, and some of the processes may be omitted or changed according to the applications or the requirements of the cryptographic processing device 201 or the biometric system. For example, in the cryptographic process in FIG. 5, when a device that is located outside the cryptographic processing device 201 generates random numbers, the process at Step 502 can be omitted. Likewise, in the cryptographic process in FIG. 6, when a device that is located outside the authentication device 402 generates random numbers, the process at Step 602 can be omitted.

In the cryptographic process in FIG. 6, instead of the Hamming distance between the vector A and the vector B, another operation result that represents the similarity or dissimilarity between the vector A and the vector B may be used.

Formulas (1) to (72) are merely examples, and other formulations may be used. For example, instead of the ascending-order transformation in Formula (43) being used for the vector A for a registrant and the descending-order transformation in Formula (44) being used for the vector B for a target to be authenticated, the ascending-order transformation may be used for the vector B and the descending-order transformation for the vector A.

In a cryptographic operation using a homomorphic encryption, addition and multiplication for two polynomials $f(x)$ and $g(x)$ may be performed on the basis of Formulas (51) and (52), instead of Formulas (53) and (54).

When the terminal 401 generates response cryptographic data res, an addition of cryptographic data $E(0)$ on the right side of Formula (61) may be omitted. The formulation such that a Hamming distance HD appears in a coefficient in a term other than a constant term included in the polynomial $D_H$ in Formula (61) may be used.

The cryptographic processing device 201, the terminal 401, and the authentication device 402 in FIGS. 2 and 4 can be implemented, for example, as a hardware circuit. In this case, each component in the cryptographic processing device 201 may be implemented as an individual circuit or a plurality of components may be implemented as an integrated circuit.

Figure 7:
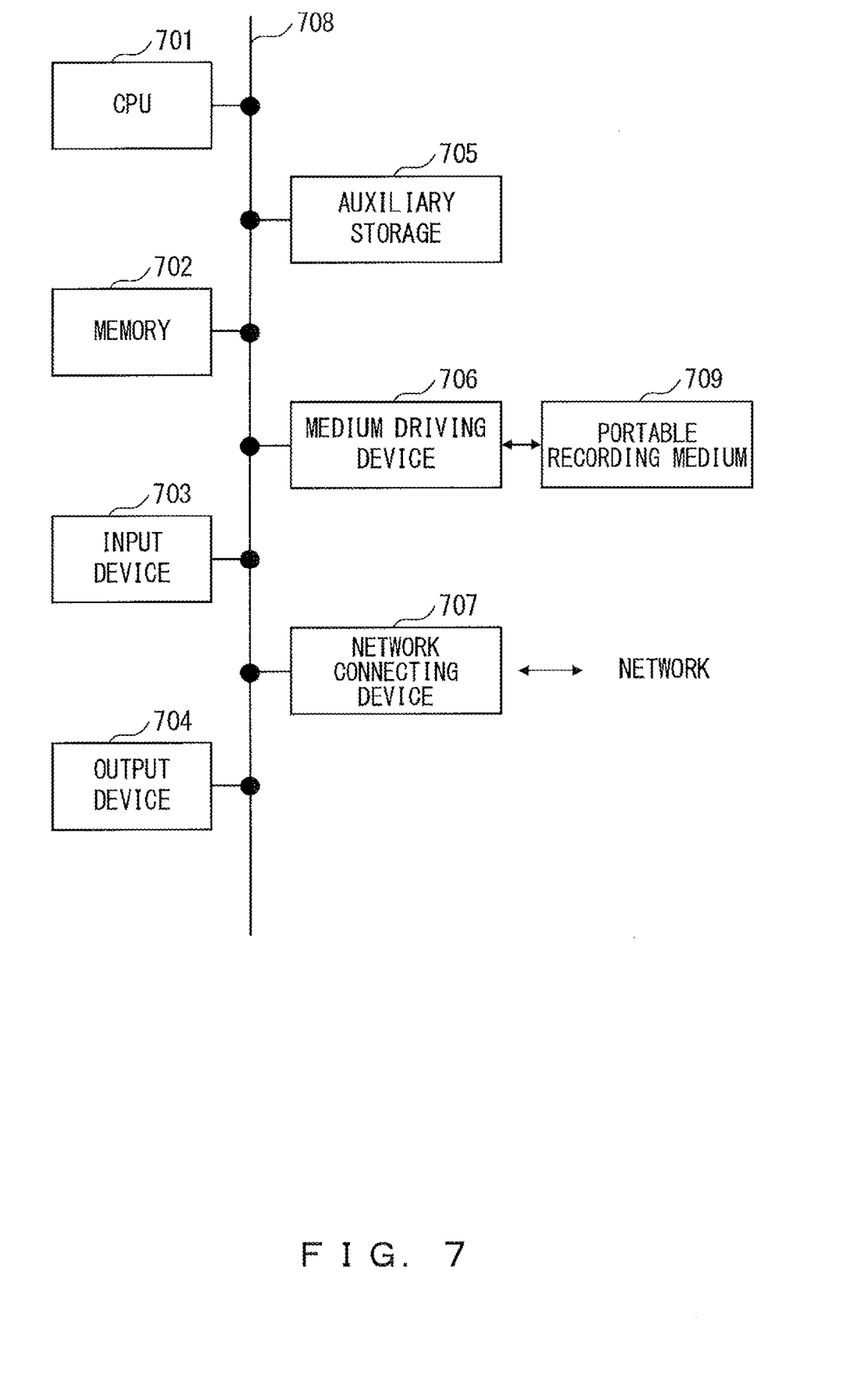
FIG. 7 is a block diagram of an information processing device.

The cryptographic processing device 201, the terminal 401, and the authentication device 402 can also be realized by using an information processing device (computer) as illustrated in FIG. 7.

The information processing device in FIG. 7 includes a central processing unit (CPU) 701, a memory 702, an input device 703, an output device 704, an auxiliary storage 705, a medium driving device 706, and a network connecting device 707. These components are connected to one another via a bus 708.

The memory 702 is, for example, a semiconductor memory such as a read only memory (ROM), a random access memory (RAM), and a flash memory. The memory 702 stores therein a program and data used for processing performed by the cryptographic processing device 201, the terminal 401, or the authentication device 402. The memory 702 can be used as the storage 211.

When the information processing device is the cryptographic processing device 201, the CPU 701 (processor) operates as the generator 213 to perform a cryptographic process by executing the program by use of the memory 702.

When the information processing device is the terminal 401 or the authentication device 402, the CPU 701 performs the processing to be performed by the terminal 401 or the authentication device 402 by executing the program by use of the memory 702.

The input device 703 is, for example, a keyboard or a pointing device, and is used for inputting instructions or information from a user or an operator. The output device 704 is, for example, a display, a printer, or a speaker, and is used for outputting inquiries to the user or the operator, or outputting a result of processing. The result of processing may be a result of the authentication processing performed by the authentication device 402.

The auxiliary storage 705 is, for example, a magnetic disk device, an optical disk device, a magneto-optical disk device, or a tape device. The auxiliary storage 705 may be a hard disk drive or a flash memory. The information processing device stores the program and the data in the auxiliary storage 705 so as to load them into the memory 702 and use them. The auxiliary storage 705 can be used as the storage 211.

The medium driving device 706 drives a portable recording medium 709 so as to access the recorded content. The portable recording medium 709 is, for example, a memory device, a flexible disk, an optical disc, or a magneto-optical disk. The portable recording medium 709 may be, for example, a compact disk read only memory (CD-ROM), a digital versatile disk (DVD), or a universal serial bus (USB) memory. The user or the operator can store the program and the data in the portable recording medium 709 so as to load them into the memory 502 and use them.

As described above, a computer-readable recording medium that stores therein a program and data is a physical (non-transitory) recording medium such as the memory 702, the auxiliary storage 705, and the portable storage medium 709.

The network connecting device 707 is a communication interface that is connected to a communication network such as a local area network (LAN) or the Internet and makes a data conversion associated with communication. The information processing device can receive the program and the data from an external device via the network connecting device 707 so as to load them into the memory 702 and use them. The network connecting device 707 can be used as the receiver 212, the output unit 214, the communication unit 411, or the communication unit 412.

The information processing device does not necessarily include all the components in FIG. 7, and some of the components can be omitted according to the applications or the requirements. For example, when the instructions or the information from the user or the operator are not to be input, the input device 703 may be omitted, and when the inquiries to the user or the operator or the result of processing is not to be output, the output device 704 may be omitted. When the information processing device does not access the portable recording medium 709, the medium driving device 706 may be omitted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A cryptographic processing device comprising:
a memory that stores therein first cryptographic information that represents an encrypted polynomial obtained by encrypting a first polynomial that corresponds to a first vector representing a first feature of first biometric information of a registrant, wherein the first biometric information is obtained from the registrant by a first sensor;
a transmitter that transmits to a terminal, second cryptographic information that represents an encrypted monomial obtained by encrypting a monomial generated by use of a first random number for a coefficient of the monomial and a second random number for an exponent of the monomial;
a receiver that receives from the terminal, third cryptographic information that represents an encrypted result obtained by encrypting a result of a multiplication of a second polynomial that corresponds to a second vector by the monomial, the second vector representing a second feature of second biometric information of an authentication target, wherein the second biometric information is obtained from the authentication target by a second sensor;
a processor that generates an encrypted polynomial that includes a result of an operation of the first vector and the second vector by use of the first cryptographic information, the third cryptographic information, and information that represents the monomial; and
an output interface that outputs fourth cryptographic information that represents the encrypted polynomial that includes the result of the operation,
wherein the processor generates an encrypted polynomial obtained by encrypting the second polynomial by multiplying the encrypted result represented by the third cryptographic information and an inverse of the monomial, and generates the encrypted polynomial that includes the result of the operation by multiplying the encrypted polynomial obtained by encrypting the first polynomial by the encrypted polynomial obtained by encrypting the second polynomial, and the output interface outputs the fourth cryptographic information to an authentication device that decrypts the fourth cryptographic information and determines whether authentication of the authentication target has been successful on the basis of the result of the operation.

2. A cryptographic processing device comprising:
a memory that stores therein first cryptographic information that represents an encrypted polynomial obtained by encrypting a first polynomial that corresponds to a first vector representing a first feature of first biometric information of a registrant, wherein the first biometric information is obtained from the registrant by a first sensor;
a receiver that receives, from a terminal receiving second cryptographic information that represents an encrypted monomial obtained by encrypting a monomial generated by use of a first random number for a coefficient of the monomial and a second random number for an exponent of the monomial, third cryptographic information that represents an encrypted result obtained by encrypting a result of a multiplication of a second polynomial that corresponds to a second vector by the monomial, the second vector representing a second feature of second biometric information of an authentication target, wherein the second biometric information is obtained from the authentication target by a second sensor;
a processor that generates an encrypted polynomial that includes a result of an operation of the first vector and the second vector by use of the first cryptographic information, the third cryptographic information, and information that represents the monomial; and
an output interface that outputs fourth cryptographic information that represents the encrypted polynomial that includes the result of the operation,
the terminal receives the second cryptographic information from an authentication device that decrypts the fourth cryptographic information and determines whether authentication of the authentication target has been successful on the basis of the result of the operation, the receiver further receives the second cryptographic information from the terminal, the processor generates the encrypted polynomial that includes the result of the operation by using the second cryptographic information as the information that represents the monomial, and by performing a prescribed operation by use of the encrypted polynomial obtained by encrypting the first polynomial, the encrypted result represented by the third cryptographic information, and the encrypted monomial represented by the second cryptographic information, and the output interface outputs the fourth cryptographic information to the authentication device.

3. The cryptographic processing device according to claim 1, wherein
the result of the operation represents a similarity or a dissimilarity between the first vector and the second vector.

4. The cryptographic processing device according to claim 2, wherein
the result of the operation of the first vector and the second vector represents a similarity or a dissimilarity between the first vector and the second vector.

5. A cryptographic processing method comprising:
transmitting, by a computer storing first cryptographic information that represents an encrypted polynomial obtained by encrypting a first polynomial that corresponds to a first vector representing a first feature of first biometric information of a registrant, to a terminal, second cryptographic information that represents an encrypted monomial obtained by encrypting a monomial generated by use of a first random number for a coefficient of the monomial and a second random number for an exponent of the monomial, wherein the first biometric information is obtained from the registrant by a first sensor;
receiving by the computer from the terminal, third cryptographic information that represents an encrypted result obtained by encrypting a result of a multiplication of a second polynomial that corresponds to a second vector by the monomial, the second vector representing a second feature of second biometric information of an authentication target, wherein the second biometric information is obtained from the authentication target by a second sensor;
generating, by the computer, an encrypted polynomial that includes a result of an operation of the first vector and the second vector by use of the first cryptographic information, the third cryptographic information, and information that represents the monomial; and outputting fourth cryptographic information that represents the encrypted polynomial that includes the result of the operation, wherein the generating the encrypted polynomial that includes the result of the operation generates an encrypted polynomial obtained by encrypting the second polynomial by multiplying the encrypted result represented by the third cryptographic information and an inverse of the monomial, and generates the encrypted polynomial that includes the result of the operation by multiplying the encrypted polynomial obtained by encrypting the first polynomial by the encrypted polynomial obtained by encrypting the second polynomial, and the outputting the fourth cryptographic information outputs the fourth cryptographic information to an authentication device that decrypts the fourth cryptographic information and determines whether authentication of the authentication target has been successful on the basis of the result of the operation.

6. A cryptographic processing method comprising:

receiving, by a computer storing first cryptographic information that represents an encrypted polynomial obtained by encrypting a first polynomial that corresponds to a first vector representing a first feature of first biometric information of a registrant, from a terminal receiving second cryptographic information that represents an encrypted monomial obtained by encrypting a monomial generated by use of a first random number for a coefficient of the monomial and a second random number for an exponent of the monomial, third cryptographic information that represents an encrypted result obtained by encrypting a result of a multiplication of a second polynomial that corresponds to a second vector by the monomial, the second vector representing a second feature of second biometric information of an authentication target, wherein the first biometric information is obtained from the registrant by a first sensor and the second biometric information is obtained from the authentication target by a second sensor;

generating, by the computer, an encrypted polynomial that includes a result of an operation of the first vector and the second vector by use of the first cryptographic information, the third cryptographic information, and information that represents the monomial; and outputting fourth cryptographic information that represents the encrypted polynomial that includes the result of the operation, wherein the terminal receives the second cryptographic information from an authentication device that decrypts the fourth cryptographic information and determines whether authentication of the authentication target has been successful the basis of the result of the operation, the computer further receives the second cryptographic information from the terminal, the generating the encrypted polynomial that includes the result of the operation generates the encrypted polynomial that includes the result of the operation by using the second cryptographic information as the information that represents the monomial, and by performing a prescribed operation by use of the encrypted polynomial obtained by encrypting the first polynomial, the encrypted result represented by the third cryptographic information, and the encrypted monomial represented by the second cryptographic information, and the outputting the fourth cryptographic information outputs the fourth cryptographic information to the authentication device.

7. The cryptographic processing method according to claim 5, wherein the result of the operation represents a similarity or a dissimilarity between the first vector and the second vector.

8. The cryptographic processing method according to claim 6, wherein the result of the operation of the first vector and the second vector represents a similarity or a dissimilarity between the first vector and the second vector.

9. A non-transitory computer-readable recording medium having stored therein a cryptographic processing program for causing a computer to execute a cryptographic process, the computer storing first cryptographic information that represents an encrypted polynomial obtained by encrypting a first polynomial that corresponds to a first vector representing a first feature of first biometric information of a registrant, wherein the first biometric information is obtained from the registrant by a first sensor, the cryptographic process comprising:

transmitting to a terminal, second cryptographic information that represents an encrypted monomial obtained by encrypting a monomial generated by use of a first random number for a coefficient of the monomial and a second random number for an exponent of the monomial;

receiving from the terminal, third cryptographic information that represents an encrypted result obtained by encrypting a result of a multiplication of a second polynomial that corresponds to a second vector by the monomial, the second vector representing a second feature of second biometric information of an authentication target, wherein the second biometric information is obtained from the authentication target by a second sensor;

generating an encrypted polynomial that includes a result of an operation of the first vector and the second vector by use of the first cryptographic information, the third cryptographic information, and information that represents the monomial; and outputting fourth cryptographic information that represents the encrypted polynomial that includes the result of the operation, wherein the generating the encrypted polynomial that includes the result of the operation generates an encrypted polynomial obtained by encrypting the second polynomial by multiplying the encrypted result represented by the third cryptographic information and an inverse of the monomial, and generates the encrypted polynomial that includes the result of the operation by multiplying the encrypted polynomial obtained by encrypting the first polynomial by the encrypted polynomial obtained by encrypting the second polynomial, and the outputting the fourth cryptographic information outputs the fourth cryptographic information to an authentication device that decrypts the fourth cryptographic information and determines whether authentication of the authentication target has been successful on the basis of the result of the operation.

10. A non-transitory computer-readable recording medium having stored therein a cryptographic processing program for causing a computer to execute a cryptographic process, the computer storing first cryptographic information that represents an encrypted polynomial obtained by encrypting a first polynomial that corresponds to a first vector representing a first feature of first biometric information of a registrant, wherein the first biometric information is obtained from the registrant by a first sensor, the cryptographic process comprising:

receiving, from a terminal receiving second cryptographic information that represents an encrypted monomial obtained by encrypting a monomial generated by use of a first random number for a coefficient of the monomial and a second random number for an exponent of the monomial, third cryptographic information that represents an encrypted result obtained by encrypting a result of a multiplication of a second polynomial that corresponds to a second vector by the monomial, the second vector representing a second feature of second biometric information of an authentication target, wherein the second biometric information is obtained from the authentication target by a second sensor;

generating an encrypted polynomial that includes a result of an operation of the first vector and the second vector by use of the first cryptographic information, the third cryptographic information, and information that represents the monomial; and outputting fourth cryptographic information that represents the encrypted polynomial that includes the result of the operation, wherein the terminal receives the second cryptographic information from an authentication device that decrypts the fourth cryptographic information and determines whether authentication processing of the authentication target has been successful on the basis of the result of the operation, the computer further receives the second cryptographic information from the terminal, the generating the encrypted polynomial that includes the result of the operation generates the encrypted polynomial that includes the result of the operation by using the second cryptographic information as the information that represents the monomial, and by performing a prescribed operation by use of the encrypted polynomial obtained by encrypting the first polynomial, the encrypted result represented by the third cryptographic information, and the encrypted monomial represented by the second cryptographic information, and the outputting the fourth cryptographic information outputs the fourth cryptographic information to the authentication device.

11. The non-transitory computer-readable recording medium according to claim 9, wherein the result of the operation represents a similarity or a dissimilarity between the first vector and the second vector.

12. The non-transitory computer-readable recording medium according to claim 10, wherein the result of the operation of the first vector and the second vector represents a similarity or a dissimilarity between the first vector and the second vector.

* * * * *